Sept. 28, 1926.  
H. K. KRANTZ  
HOUSING FOR ELECTRICAL FIXTURES  
Filed June 3, 1921

WITNESSES:

INVENTOR  
Hubert K. Krantz.  
BY  
ATTORNEY

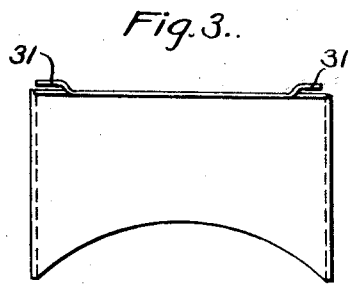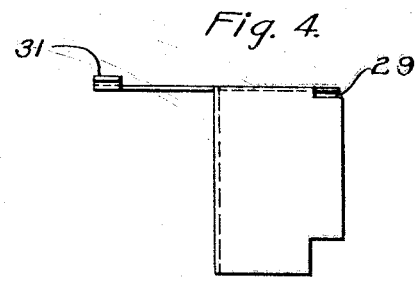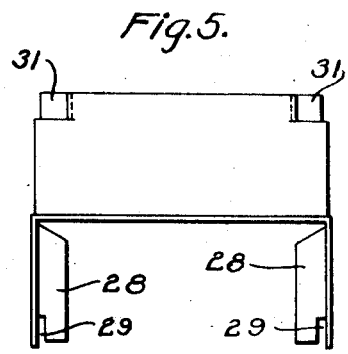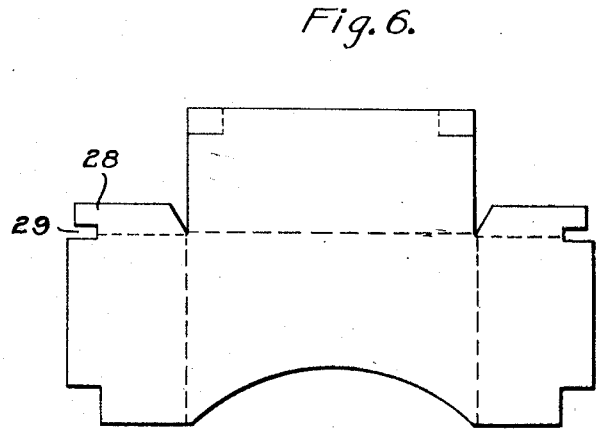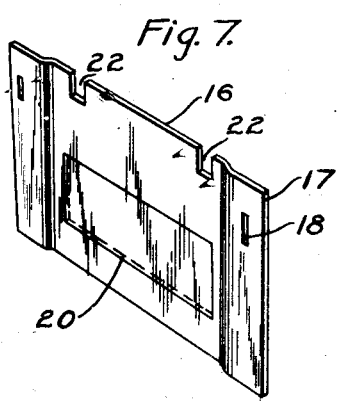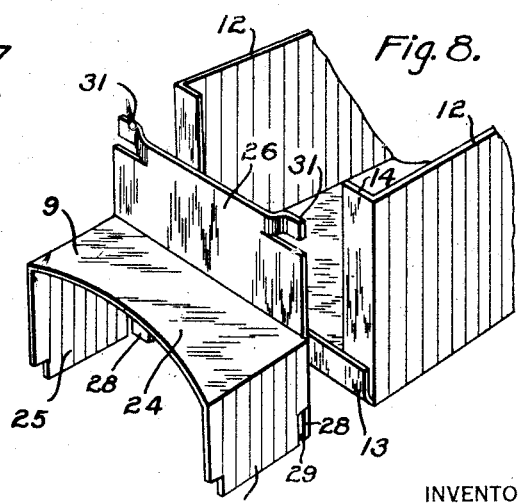

Patented Sept. 28, 1926.

1,601,312

UNITED STATES PATENT OFFICE.

HUBERT K. KRANTZ, OF WILKINSBURG, PENNSYLVANIA, ASSIGNOR TO WESTINGHOUSE ELECTRIC & MANUFACTURING COMPANY, A CORPORATION OF PENNSYLVANIA.

HOUSING FOR ELECTRICAL FIXTURES.

Application filed June 3, 1921. Serial No. 474,816.

My invention relates to protective casings for electrical service connection and meter devices.

One object of my invention is to provide a protective casing of simple construction that may be stamped from sheet metal and wherein certain of the side walls are adapted to support the meter-adaptor extension or trim.

Another object of my invention is to provide a protective casing, having the above characteristics, wherein certain wall members are secured to the housing without the use of screws or bolts and wherein the meter-adaptor extension is attached to the main housing by means of portions of the meter adaptor which slidably engage attaching means on the housing.

A further object of my invention is to provide a meter-adaptor extension or trim that is made of one piece of sheet metal and is provided with integral fastening devices by which it may be detachably secured to the main housing.

These and other objects, that will be made apparent throughout the further description of the invention, are attained by means of the apparatus hereinafter described, and illustrated in the accompanying drawings, wherein:

Figs. 3, 4 and 5 are top plan, side and front elevational views, respectively, of the meter adaptor extension;

Fig. 6 is a view of the blank out of which the adaptor is constructed;

Fig. 7 is a perspective view of one of side wall plates forming a part of the main housing; and Fig. 8 is a fragmental perspective view of a box for a two-pole switch showing the meter trim in disassembled relation.

Figure 1:
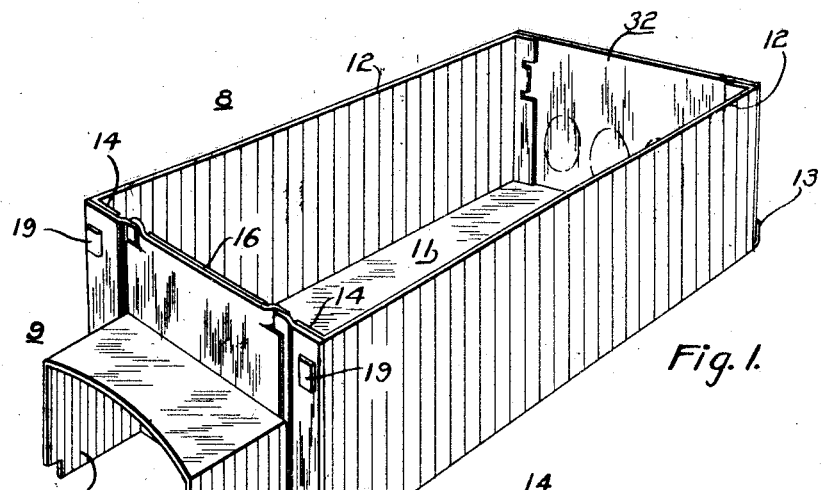
Figure 1 is a perspective view of a protective housing and meter adaptor extension embodying features of my invention.

Referring to the drawings, the apparatus includes a main casing or housing 8 and an auxiliary housing 9, the former being adapted to contain a switch and fuse mechanism, connecting the meter to the switch apparatus usually disposed within the housing.

The main housing 8 includes a bottom portion 11 having integral side-wall members 12 bent at right angles to the bottom member. The bottom and side members are formed from a single sheet of metal, and the bottom portion 11 is provided, at its ends, with flanges 13 which are disposed at right angles to the bottom portion and are spaced from the inwardly directed flanges 14 which are integral with, and disposed at right angles to, the side members.

This arrangement provides a space 15 between the flanges 13 and 14 for receiving the lower edge of a detachable end-wall member 16. The end-wall member 16 comprises a flat sheet of metal having its central portion offset from the plane of its end portions 17 which are adapted to exteriorly overlap the flanges 14. The portions 17 are adapted to fit within the space 15 disposed between the flanges 13 and 14 of the bottom and side members, respectively, and are provided with slots 18 into which struck-up tongues 19 carried by the flanges 14 project when the end plate 16 is disposed in assembled relation with respect to the side and bottom members.

The tongues 19 are bent over the outer face of the end member 16 for the purpose of retaining the end plates in assembled relation with the bottom and side members.

Figure 2:
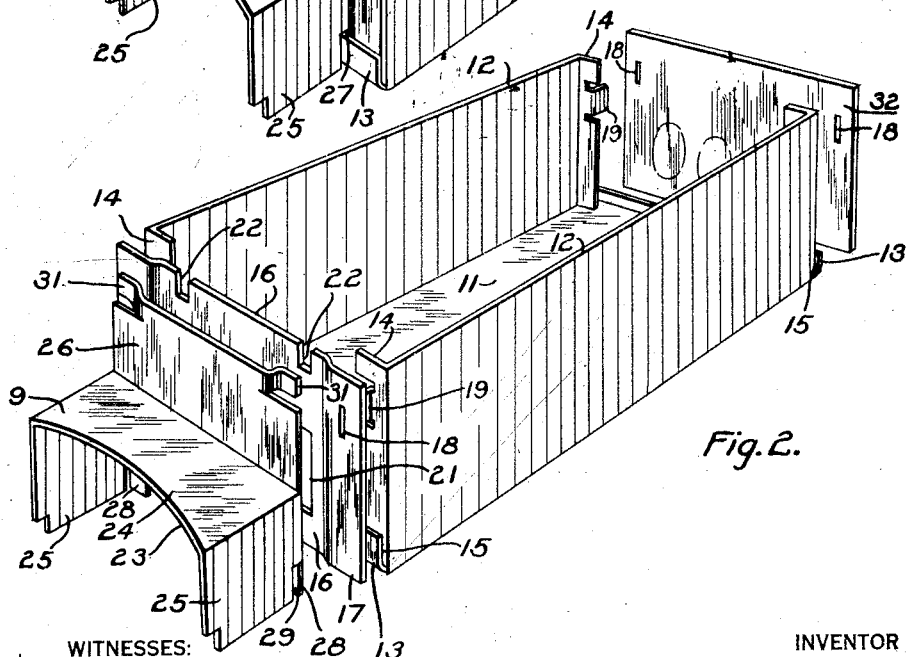
Fig. 2 is a perspective view of the elements constituting the housing shown in Fig. 1, the various elements being shown in disassembled relation.

The end plate 16 is provided with a rectangular knockout portion 20, indicated in Fig. 7, which may be removed in the usual manner for the purpose of providing an opening 21, as shown in Fig. 2, through which conductors may lead into the housing. The outer edge of the end plate 16 is provided with notches 22 for the purpose of receiving interlocking tongues that are carried by the meter-adaptor extension or trim.

The adaptor extension or trim comprises a single sheet of metal shown in Fig. 6 that is so bent as to form a channel portion 23 having a front wall 24 and side walls 25. A portion of the front wall 24 is bent outwardly at right angles thereto and constitutes a dust-lap 26 which is of such a width that it may closely engage the offset portion of the plate 16 when the extension or trim is disposed in assembled relation with the end plate 16, as indicated in Fig. 1.

When the end plate 16 is in assembled relation with the bottom and side members, a space 27 is provided, due to the offset in the end plate, between the flanges 13 and the offset portion of the end plate. The side walls 25 of the extension or trim are provided with inwardly directed flanges 28 that are provided with notches 29, as illustrated in Figs. 2, 4, 5 and 8. The flanges 28 are disposed in the same plane as is the dust-lap 26 and, consequently, fit into the space 27 between the flanges 13 and the offset portion of the plate 16. The flanges 28 are, therefore, so interlocked with the flanges 13 of the bottom portion 11 that lateral displacement of the extension or trim is prevented.

The dust-lap 26 is provided with tongues 31 that are disposed in offset relation with respect to the dust-lap 26 and are so positioned that they enter the slots 22 in the end plates and engage the inner surface thereof.

It will be seen from the foregoing that the extension or trim 9 may be secured to the end plate 16 by simple sliding movement toward the bottom of the housing. Displacement of the trim in a direction that will disengage it from the housing is prevented by the cover (not shown) which overlaps the outer edge of dust-lap 26.

As illustrated in Figs. 1 and 2, one end of the box is closed by means of a flat plate 32, the lower edge of which fits within the space 15. The plate is provided with slots 18 for receiving the tongues 19 carried by the flanges 14.

The housing illustrated is of sufficient width to accommodate a three-pole switch. Boxes for containing two-pole switches are similar to the box illustrated, with the exception that they are narrower and are substantially the width of the meter-adaptor extension 9. The extension 9 may, therefore, be applied directly to the narrower box without the use of an end plate 16, as illustrated in Fig. 8. The lugs 31 and the flanges 28 of the extension 9 directly engage the inner faces of the flanges 14 and 13, respectively, and prevent separation of the extension and the housing.

The various wall members and trim may be stamped from sheet metal and assembled without the use of screws or bolts. For these reasons, the apparatus is inexpensive to manufacture and may readily be assembled.

While I have described and illustrated but two embodiments of my invention, it will be apparent to those skilled in the art that various changes, modifications, substitutions, additions and omissions may be made in the apparatus without departing from the spirit and scope of the invention, as set forth in the appended claims.

I claim as my invention:

1. A protective housing for service and meter-connection devices comprising a main housing and an auxiliary housing, the latter constituting a meter-adaptor extension, the main housing having a flanged bottom wall and side walls having flanges spaced from the flange of the bottom wall for receiving and supporting a wall member between the said flanges, the wall member having means thereon for securing the auxiliary housing thereto.

2. A protective housing for service and meter-connection devices comprising a main housing having a separate wall member and an auxiliary housing, the latter constituting a meter-adaptor extension, the main housing having a flanged bottom wall and side walls provided with flanges spaced from the flange on the bottom wall for receiving and supporting the wall member between the said flanges, the wall member being offset from the flange of the bottom wall to provide space for receiving a portion of the auxiliary housing between the flange of the bottom wall and the said wall member.

3. A protective housing for service and meter-connection devices comprising a main housing and an auxiliary housing, the latter constituting a meter-adaptor extension, the main housing having a flanged bottom wall and side walls attached thereto and having their ends spaced from the flange of the bottom wall and a wall member disposed in the space between the flanges of the bottom wall and the side walls, the wall member being offset from the flanges of the bottom wall for receiving a portion of the auxiliary housing between the flange of the bottom wall and the wall member.

4. A protective housing for service and meter-connection devices comprising a main housing and an auxiliary housing, the latter constituting a meter-adaptor extension, the main housing having a flanged bottom wall and side walls attached thereto provided with flanges spaced from the flange of the bottom wall, a wall member fitting in the space betwen the flange of the bottom wall and the side walls and being offset from the flange to provide a space for receiving a portion of the auxiliary housing between the flange and the wall member, the said flanges of the side walls being provided with integral means for securing the wall member to the side walls.

5. A protective housing for service and meter-connection devices comprising a main housing and an auxiliary housing, the latter constituting a meter-adaptor extension, the main housing having a flanged bottom wall, side walls attached thereto provided with inwardly directed flanges spaced from the flange of the bottom wall and a wall member fitting in the space between the flange of the bottom wall and the flanges of the side walls, means for preventing outward displacement of the free edge of the wall member and means for attaching the auxiliary housing to the wall member.

6. A protective housing for service and meter-connection devices comprising a main housing and an auxiliary housing, the latter constituting a meter-adaptor extension, the main housing having a flanged bottom wall and side walls attached thereto provided with flanges spaced from the flange of the bottom wall and a wall member fitting in the space between the flanges of the bottom wall and the side walls, and having a portion offset from the bottom wall flange to provide a space between the last said flange and the outer face of the wall member, the said auxiliary housing having a portion fitting within the space, and a portion interlocking with the outer edge portion of the wall member.

7. A protective housing for service and meter-connection devices comprising a main housing and an auxiliary housing, the latter constituting a meter-adaptor extension, the main housing having side walls and a bottom portion provided with a flange spaced from the ends of the walls and a wall member provided with a notch in the outer edge thereof and fitting in the space between the flange and end walls, the auxiliary housing being provided with a tongue for extending into the notch and a tongue for engaging the flange for preventing separation of the auxiliary housing and the main housing.

8. A protective housing for service and meter-connection devices comprising a main housing and an auxiliary housing, the latter constituting a meter-adaptor extension, the main housing having a flanged bottom portion and the auxiliary housing being formed in one piece having side and end portions, the side portions of which are provided with inwardly directed flanges for overlapping the flange of the bottom portion for preventing longitudinal separation of the auxiliary housing and the main housing.

In testimony whereof, I have hereunto subscribed my name this 24th day of May, 1921.

HUBERT K. KRANTZ.